United States Patent [19]

Brown

[11] Patent Number: 4,998,691
[45] Date of Patent: Mar. 12, 1991

[54] U-SHAPED PIPE CLAMPING SYSTEM
[75] Inventor: David P. Brown, Salt Lake City, Utah
[73] Assignee: Baker Hughes Incorporated, Houston, Tex.
[21] Appl. No.: 468,552
[22] Filed: Jan. 23, 1990
[51] Int. Cl.[5] .............................................. F16L 3/08
[52] U.S. Cl. .................................... 248/74.1; 248/68.1
[58] Field of Search ................... 248/74.1, 74.4, 74.5, 248/73, 68.1, 69, 62, 70

[56]  References Cited
U.S. PATENT DOCUMENTS

| | | | |
|---|---|---|---|
| 2,539,783 | 1/1951 | Kirk, Jr. | 248/62 |
| 3,652,045 | 3/1972 | Hirt | 248/62 |
| 4,063,700 | 12/1977 | Brewer | 248/62 |
| 4,143,844 | 3/1979 | Van Meter | 248/62 |
| 4,573,652 | 3/1986 | Richards | 248/74.1 |
| 4,765,106 | 8/1988 | Modrovich | 248/70 X |

FOREIGN PATENT DOCUMENTS

| | | | |
|---|---|---|---|
| 2754752 | 6/1979 | Fed. Rep. of Germany | 248/74.4 |
| 2754772 | 6/1979 | Fed. Rep. of Germany | 248/74.4 |
| 1158661 | 7/1969 | United Kingdom | 248/74.1 |

OTHER PUBLICATIONS

Pages C-3 and C-5 of Water Pollution Control Corp., Sanitaire ™ Manual, 2/84.

Primary Examiner—Ramon O. Ramirez
Attorney, Agent, or Firm—Skjerven, Morrill, MacPherson, Franklin and Friel

[57]  ABSTRACT

A pair of generally L-shaped identical rod members having a cantilevered bottom end extending transversely from a horizontal base portion are assembled so that the cantilevered end of a first rod member can abut the horizontal base portion of a second rod member while the cantilevered end of the second rod member simultaneous abuts the horizontal base portion of the first rod member. The abutments of the two rods can be made along part or effectively all of the reach or length of the rod members base portions so that the vertical portions of the rod members have two or more different spans therebetween so as to accommodate a range of pipe diameters to be supported. The abutment of the respective cantilevered ends and the horizontal base portions of the rod members are either welded together or clamped securely at various spans forming a closed generally rectangular loop bounded by the respective cantilevered ends and base portions of the two rod members. The closed loop of the rod member assembly is inserted around and clamped to an anchoring post or stud in a concrete or other bottom of an aeration or other tank. The piping is supported at a desired vertical height by a pair of clamp halves levelled and secured by nuts on threaded vertical legs of the respective rod members.

12 Claims, 2 Drawing Sheets

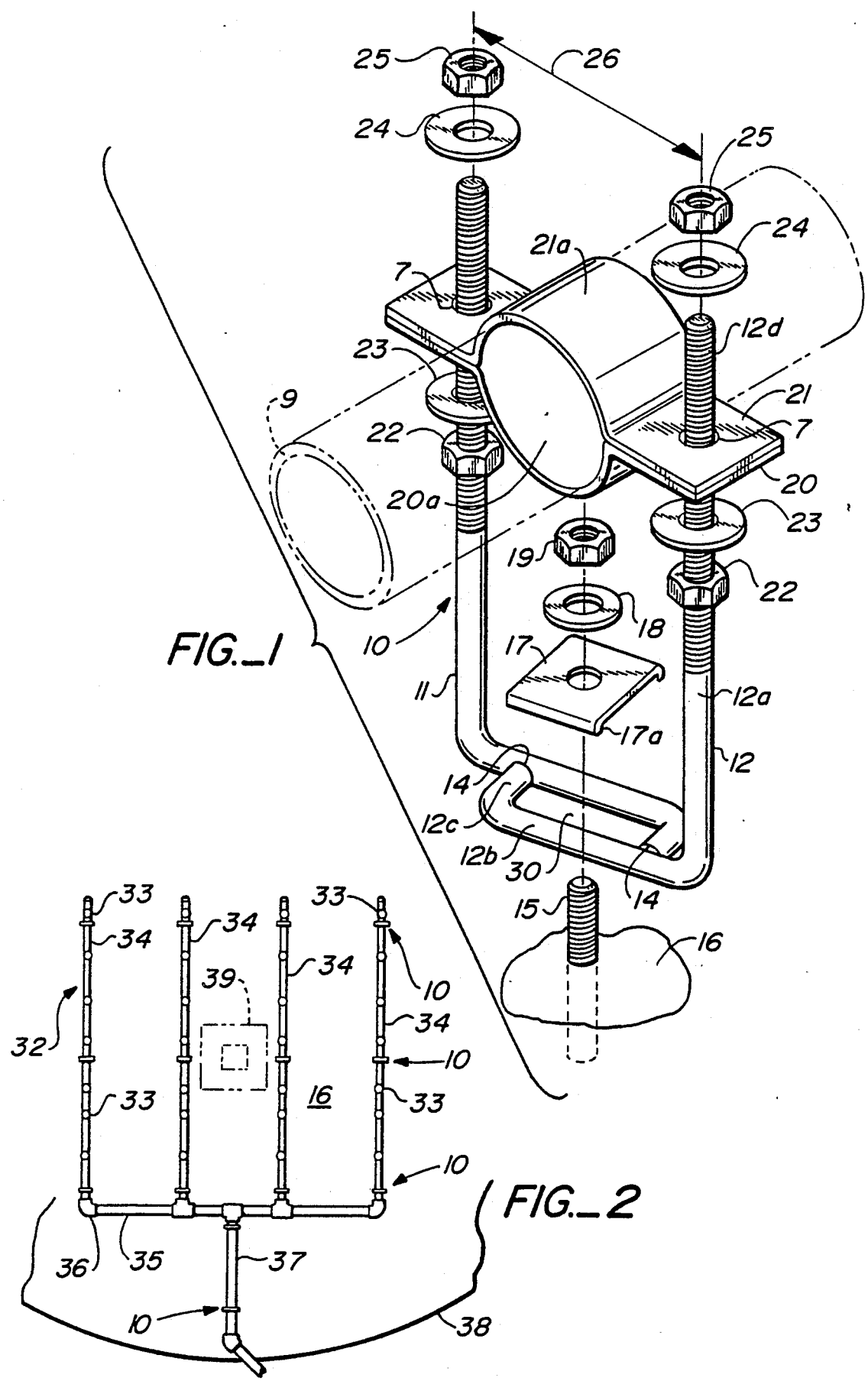

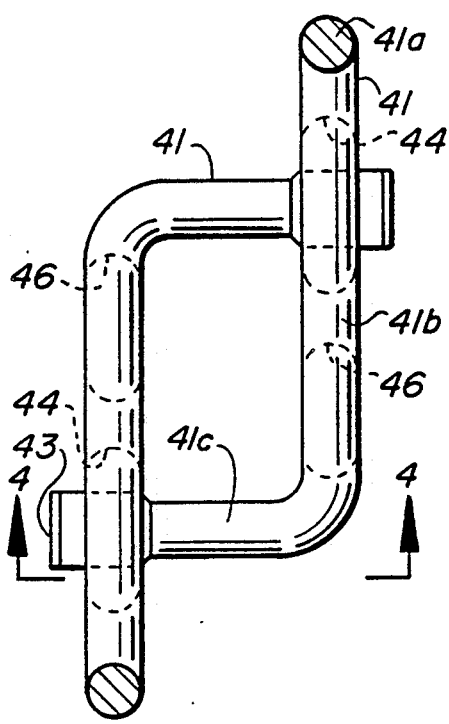
FIG._3
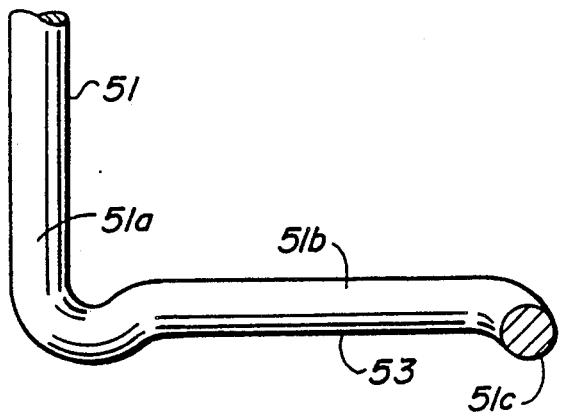
FIG._5
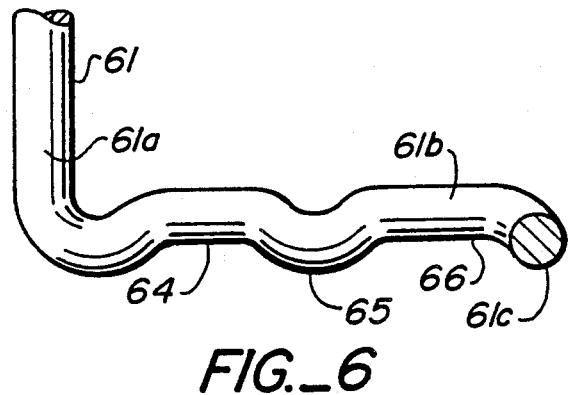
FIG._6
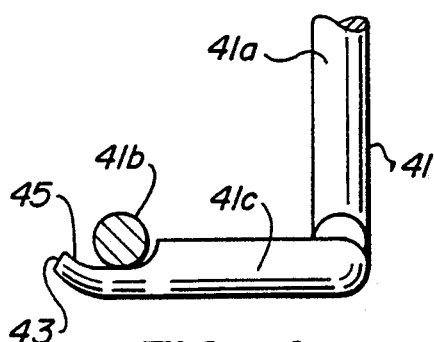
FIG._4
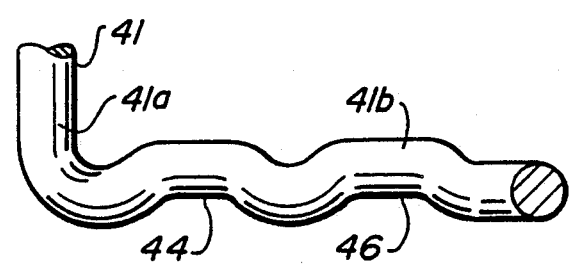
FIG._7

U-SHAPED PIPE CLAMPING SYSTEM

BACKGROUND OF THE INVENTION

This invention relates to a pipe supporting system. More particularly, the invention is directed to a pipe clamping device for piping spaced over a floor of a liquid/solids holding vessel.

Various clamping systems have been employed to hold and support piping which is to extend above and parallel to a ground surface. Illustrative of these pipe anchoring devices is the clamp seen in U.S. Pat. No. 4,389,034, where a hinged pipe clamp extends between a pair of upstanding posts anchored in ground strata, and U.S. Pat. No. 4,765,106, where a pair of clamp halves are mounted on a pair of driving bolts or where an angled channel extends between two bolts extending into a concrete floor, the channel being grooved to receive the pipe U.S. Pat. Nos. 2,539,783; 3,194,590; 4,063,700; and 4,143,844 show other types of pipe supports, albeit ones hanging down from a beam or roof surfaces, which have a horizontal base portion, a vertical portion, and either a pair of clamp halves or a single U-shaped bolt encompassing the pipe.

The closest prior art known to Applicant is a header guide support sold under the trademark "Sanitaire" by Water Pollution Control Corp. This support includes a single U-shaped member threaded on its vertical legs and bent in a sinuous form in its horizontal reach or base to form an open slot which is mounted over a threaded anchor bolt extending upwardly from a floor surface. A locating plate is passed over the bolt and clamped by a nut over and against the sinuous base of the U-shaped member and a pair of clamp halves utilized to clamp a pipe between the fixedly spaced integral legs of the U-shaped support member A separately sized U-shaped support member is needed for each size of pipe or large spaces between the legs are necessary to accommodate the largest size pipe with a series of pipe clamp halves having various pipe-holding diameters for the largest and smaller diameter pipes. Further mere loosening of the clamped locating plate may permit pivoting of the support base out the open end of the open slot causing a possible pipe-support failure at that point. Still further because the anchor on the Sanitaire device is not directly on the centerline of the support there is a "prying" or bending when there is an upward force on the support.

SUMMARY OF THE INVENTION

The present invention provides a piping support system including individual pipe supports for supporting the piping components, particularly of diffused aeration systems. This piping comprises horizontal pipe headers and laterals that are typically located near the concrete bottoms of circular or rectangular concrete tanks These tanks are typically filled with wastewater or sewage. The invention supports are anchored to the concrete tank bottoms and clamp around header and lateral pipes at predetermined intervals. The supports are designed to resist either upward or downward loads. In general the support includes two rod members of the exact same construction which are weldable or clamped together at a specified span depending on the pipe size being supported. The two rod members are then clamped to a threaded post or stud extending from a liquid/solids-containing tank bottom. A pair of clamp halves, supported at a particular vertical level on vertical portions of the bent rod members, are now connected at the described span; and a pipe is clamped therebetween by use of levelling nuts and securing nuts.

The assembly is suitable to support any lightly to moderately loaded similarly arranged piping system. In the system of the invention the post or stud for each support is located in the same vertical plane as is formed by the two vertical legs of the two generally L-shaped rod members. Each rod member base is horizontal and includes a cantilevered transverse end portion which, when assembled with another rod member of the same construction in face-to-face abutting relation, forms a closed loop extending medially of the vertical legs. The significant advantage of this arrangement is that any pullout forces induced by the piping system on the supports are resisted by the post or stud in direct tension rather than by a combination of tension and bending due to eccentric prying that occurs with typical designs. The result is that smaller, more efficient posts or studs and support rods can be used to support the piping than can be used with other constructions.

By setting the span before welding the two support rods together, or by clamping the rods at various spans, it is possible for a pair of identical rod members to be used for several pipe sizes, thereby significantly simplifying inventory and documentation requirements. This also results in other economy advantages such as the opportunity for higher quantity production of a fewer number of components for a given range in pipe sizes. Another feature of the welded rod or clamped span assembly is that there is the resulting gap or slot at the bottom of the assembly in the area of the anchor bolt. This allows significantly more lateral adjustability that with more conventional constructions, thereby permitting easier lateral alignments and less rigid tolerance requirements for locating and installing the anchor posts. The securing method clamps the assembly tightly to the concrete bottom after the alignments are made, thus preventing movement. The invention optimizes material, manufacturing processes, and installation procedures while minimizing engineering design efforts and simplifying inventory and documentation requirements. It is a significant non-complex development over conventional and previously used supports.

BRIEF DESCRIPTION OF THE DRAWINGS

FIG. 1 is an exploded perspective view of the piping support of the invention.

FIG. 2 is a plan view of a piping system employing the piping support.

FIG. 3 is a partial cross-sectional plan view of a second embodiment of a pair of rod members.

FIG. 4 is a cross-sectional view taken on the line 4—4 of FIG. 3.

FIG. 5 is a side cross-sectional view of a third embodiment of a rod member.

FIG. 6 is a side cross-sectional view of one of the rod members of FIG. 3.

FIG. 7 is a side cross-sectional view of a fourth embodiment of a rod member.

DETAILED DESCRIPTION OF THE INVENTION

The overall pipe support 10 of the invention is seen in FIG. 1 where a pair of substantially identical L-shaped rod members 11 and 12 are welded at 14 with a desired amount of overlap of each other dependent on the diameter of the pipe to be supported. Each rod member has a vertical stem 12a having a relatively long threaded end 12d extending over about one-half its length. A rod member base portion 12b extends orthogonally and horizontally from its vertical stem and a cantilevered curved free end 12c extends transverse to base portion 12b in the plane of the base portion so that when the base portions of two similarly bent rod members are placed in face-to-face relationship, the curved ends of each abut the base portion of the other rod member forming a slot or closed loop 30 between the curved ends. The abutting curved ends are then welded by suitable weldment 14 to the base portion. The length of the slot is dependent on the amount of overlap of the base portions prior to welding and is dictated by the diametrical size of the pipes to be supported and the diametrical size of the curved clamp portions 20a, 21a and the positions of the end apertures 7 of a pair of clamp halves 20, 21. The rod members 11, 12 are then placed over a threaded post or stud 15 fixedly embedded in or extending from a concrete or other floor 16 so that the base portions of the rod members rest on the floor. A clamp plate 17 is placed over the rod members' base portions so that lips 17a of the base plate abut and curl around the top of the base portions, for example, portions 12b. A fastener including a washer 18 and nut 19 is placed over the threaded fixed post or stud 15 and cinched up to securely hold the pipe support on the stud and against the floor 16.

Levelling nuts 22 and washers 23 are positioned at a desired position above floor 16 on the threaded rod portions 12d. The pipe is then placed on a clamp half 20 placed over the threaded section, the other clamp half 21 mounted over the pipe 9 and the assembly clamped by upper washers 24 and upper securing nuts 25 against the washers 23 and nuts 22. It is thus seen that there is flexibility as to the particular height at which the pipe is to be placed with respect to the floor 16 at that particular location of the pipe support. The distance 26 between the rod members 11, 12 is dependent on the amount that the base portions overlap to form a chosen length of closed slot 30.

FIG. 2 shows a typical piping system 32, for example, contained on a bottom 16 of a treatment tank 38, such as one used for aeration of a liquid/solids mixture as in wastewater treatment. For example, four parallel pipe runs 34 are connected by suitable pipe elbows 36 to a header pipe 35 which in turn is connected to an inlet pipe 37 extending into the bottom of tank 38. Each pipe run 34 contains a series of upwardly facing aeration devices 33 such as those seen in U.S. Pat. Nos. 4,764,314 and 4,848,749. A tank drain 39 normally extends from floor 16. Pipe supports 10 are positioned on the floor 16 to support piping runs 34 and inlet piping 37 at various positions dependent on the pipe loadings.

FIG. 3 illustrates a two-position embodiment of the pipe support where each rod member 41 has a vertical portion 41a, a horizontal base portion 41b, and a transverse portion 41c. A cantilevered end portion 43 having a saddle-like upper surface portion 45 extends from portion 41c. The base portions 41b of the rod members each have indents 44, 46 in their bottom surfaces (FIG. 7), into which the respective cantilevered end portions 43 slide and are stabilized. As shown in FIG. 4, the rod base portion 41b of one rod member, more particularly one or the other of indents 44 or 46, thus seats on the saddle surface 45 of the end portion of the other rod member. A corresponding indent of the other member simultaneously sits on a saddle surface of the first rod member. Indents 44 which are closer to the vertical member than indents 46, allow for one relative small span of the vertical stems while use of indents 46 permit a greater spacing or span of the vertical stems of the respective rod members. This two-position support thus allows use with pipes of small diameter utilizing indents 44 or with pipes of larger diameter utilizing indents 46. The assemblage of two rod members is simultaneously or subsequently place over a stud or post and clamped thereto in the same manner as illustrated in FIG. 1. In this embodiment due to the relative close fitting of the curved end 43 and the surface of indent 44 or 46 of the base portion 41b, there is no necessity of welding the abutting surfaces since they are adequately held on the post 15 by the clamp plate 17 and nut 19 forcing portion 41b at the indents against the respective saddle surfaces 45.

FIG. 5 shows a further embodiment of the invention in which one long indent 53 is provided by a suitable bend in base portion 51b extending from the vertical stem 51a of each rod member 51. The cantilevered end more particularly the saddle surface of one rod member, corresponding to that shown in FIGS. 3 and 4, is insertable into and at a desired position along indent 53 on the other rod member while the cantilevered end of the other rod member is positioned in a similar position along an indent 53 of the one rod member. Thus dependent on the position of ends 51 along the length of indents 53 a wide variety of spacings of the vertical stems of the two rod members is available so as to accommodate pipes and pie clamps of various sizes.

FIG. 6 shows a further embodiment in which two relatively wide indents 64, 66 are provided in each base portion 61b extending from a vertical stem 61a of rod members 61. A medial portion 65 of the base portion between the indents 64, 66 sits on the tank floor and gives more stability to the overall pipe support. The cantilevered ends 61c can be positioned along the length of either of indents 64 or 66 thus allowing for accommodation of various rod member stems spacing to accommodate various pipe clamp halves and pipes and to accommodate loose tolerances in the setting of the anchoring posts.

The above description of embodiments of this invention is intended to be illustrative and not limiting. Other embodiments of this invention will be obvious to those skilled in the art in view of the above disclosure.

I claim:
1. A piping support comprising:
   a first generally L-shaped rod member having a first elongated threaded stem extending from a first integral base member;
   a second generally L-shaped rod member substantially identical to said first rod member and having a second elongated threaded stem integrally extending from a second base member;
   said base members being juxtaposed in a base plane with respect to said stems and wherein an opening is formed between said base members and wherein said stems extend in spaced relationship;
   means for adjustably spacing said threaded stems and for joining said rod members at their base members to accommodate pipes of different diameters;
   base clamp means contacting said base members for connecting said joined members to a fixed post extending through said opening; and pipe clamp means positioned on and across said stems and displaced in a spaced plane above said base plane for clamping and spacially holding a pipe extending between said stems.

2. The pipe support of claim 1 wherein each of said base members has at a cantilevered end extending in said base plane and wherein the cantilevered end of each rod member is welded to a section of the base member of the other rod member to form said opening as a closed loop.

3. The pipe support of claim 1 wherein said base clamp means comprises an apertured clamp plate positional over said base members and said opening and a fastener clamping said plate and said base members to said fixed post.

4. The pipe support of claim 1 wherein said means for adjustably spacing comprises means for positioning said stems closer together or further apart and wherein said base members are fixedly joined at such position to accommodate various sized pipes and various sized pipe clamp means.

5. The pipe support of claim 1 wherein each of said base members includes a free end which is welded to a section of the other base member to form said opening as a closed loop and wherein said closed loop is positionable on said fixed post.

6. The pipe support of claim 5 wherein said closed loop is of a length dependent on a desired spacing of said stems resultant from the size of the pipe to be supported.

7. A piping support system for a matrix of pipes extending over a concrete base, said system comprising a series of posts extending upwardly from said concrete base at desired pipe support positions, and a series of pipe supports connected to said posts and extending upwardly therefrom, each of said pipe supports comprising a pair of generally vertical discrete stems each having an orthogonal base portion, said base portions being adjustable with respect to each other to accommodate pipes of various sizes and forming a closed loop of a desired length surrounding a post, said base portions being fixed to said post, a first pipe clamp half affixable to said stems at a predetermined position on said stems for receipt of a pipe bottom portion and a second pipe clamp half affixable across said stems and fitted against a pipe top portion for clamping said pipe at a fixed position between said stems above said closed loop base portions.

8. The piping support system of claim 7 in which each orthogonal base portion has a cantilevered curved end welded to a portion of an opposed pipe support base portion to form said closed loop and wherein each of said series of posts pass through the closed loop of the base portions of each pipe support and wherein said base portions are clamped to said posts.

9. The piping support system of claim 7 in which each orthogonal base includes portion an orthogonal end portion intersecting and clampable to a base portion of an opposed pipe support stem.

10. The piping support system of claim 9 in which each of said base portions includes at least one bottom indent and each orthogonal end portion includes a saddle top surface insertable in one of said at least one bottom indent of an opposed one of said base portions.

11. The piping support system of claim 10 in which said at least one bottom indent is a single elongated indent in each base portion and wherein the saddle top surface of an opposed end portion is insertable into said single elongated indent at any desired position along said single elongated indent to accommodate pipes of various sizes.

12. The piping support system of claim 10 in which said at least one bottom indent includes a pair of indents and wherein an end portion of an opposed end portion including said saddle top surface is insertable into one or the other of said pair of indents to accommodate pipes of various sizes.

* * * * *